United States Patent [19]
Fischer et al.

[11] Patent Number: 5,653,210
[45] Date of Patent: Aug. 5, 1997

[54] METHOD AND DEVICE FOR THE OPEN-LOOP AND/OR CLOSED LOOP CONTROL OF A FINAL CONTROLLING ELEMENT

[75] Inventors: Werner Fischer, Heimsheim; Johannes Locher, Stuttgart; Peter Schmitz, Ludwigsburg; Dietbert Schoenfelder, Gerlingen; Peter Lutz, Weinsberg, all of Germany

[73] Assignee: Robert Bosch GmbH, Stuttgart, Germany

[21] Appl. No.: 636,815

[22] Filed: Apr. 23, 1996

Related U.S. Application Data

[63] Continuation of Ser. No. 202,314, Feb. 28, 1994, abandoned.

[30] Foreign Application Priority Data

Mar. 17, 1993 [DE] Germany ............. 43 08 541.2

[51] Int. Cl.⁶ .................................................. F02M 37/04
[52] U.S. Cl. .................................... 123/501; 123/479
[58] Field of Search ............................ 123/501, 502, 123/357, 358, 359, 479

[56] References Cited

U.S. PATENT DOCUMENTS

| | | | |
|---|---|---|---|
| 4,265,200 | 5/1981 | Wessel | 123/501 |
| 4,592,327 | 6/1986 | Fujimori | 123/502 |
| 4,617,902 | 10/1986 | Hirano | 123/479 |
| 4,638,782 | 1/1987 | Yasuhara et al. | |
| 4,730,586 | 3/1988 | Yamaguchi | 123/479 |
| 4,793,308 | 12/1988 | Brauninger | 123/479 |
| 4,825,373 | 4/1989 | Nakamura | 123/501 |
| 5,188,084 | 2/1993 | Sekiguchi | 123/502 |
| 5,315,976 | 5/1994 | Birk | 123/501 |

FOREIGN PATENT DOCUMENTS 3400711  7/1984  Germany.

Primary Examiner—Carl S. Miller
Attorney, Agent, or Firm—Kenyon & Kenyon

[57] ABSTRACT

A method and a device for the open-loop and/or closed-loop control of a final controlling element, in particular for influencing the fuel injected into an internal combustion engine, are described. A system deviation is defined starting from a setpoint and an actual value. On the basis of the system deviation, a loop controller specifies a manipulated variable to be received by the final controlling element. If the system deviation lies outside of a range defined by at least two values, a maximum value is specified for the manipulated variable.

23 Claims, 3 Drawing Sheets

METHOD AND DEVICE FOR THE OPEN-LOOP AND/OR CLOSED LOOP CONTROL OF A FINAL CONTROLLING ELEMENT

This application is a continuation of application Ser. No. 08/202,314, filed on Feb. 28, 1994 now abandoned.

FIELD OF THE INVENTION

The present invention relates to a method and apparatus for open-loop and/or closed-loop control of a final controlling element.

BACKGROUND OF THE INVENTION

German No. 34 00 711 (corresponding to U.S. Pat. No. 4,638,782) describes an open-loop and/or closed-loop control of a final controlling element for influencing the metering of fuel into an internal combustion engine, wherein a system deviation is defined starting from a setpoint and an actual value. On the basis of the system deviation, a loop controller specifies a manipulated variable to be received by the final controlling element. A loop controller, preferably having Proportional-Plus-Integral (PI) action executes a closed-loop control at high rotational speeds. In certain operating states, particularly at low rotational speeds, only an open-loop control of the final controlling element takes place.

Such PI controllers require a very high degree of complexity for applications, especially when different parameter sets are provided for high-level and low-level signal action. At low rotational speeds, no closed-loop control operation is possible. Instead, only an open-loop control of the final controlling element is provided. Another disadvantage of the known procedure is that it is very difficult to optimally design a loop controller. For example, for large system deviations, it is desirable to have very large gains (i.e., amplification factors) in the loop controller. On the other hand, when there are small system deviations (low-level signal action), it is advantageous to have very small gains.

SUMMARY OF THE INVENTION

The method and apparatus according to the present invention have an advantage of allowing the final controlling element to be optimally adjusted in all operating states.

In accordance with the present invention, by providing at least one maximum value for the manipulated variable when the system deviation lies outside of a range defined by at least two values, a considerable improvement in the control response can be achieved. The degree of accuracy can be further improved for low-level signal action by applying a PI-controller within the above-defined range.

At low rotational speeds, for example, the actual-value signal occurs only at larger time intervals. In such a situation, it is known to change over to an open-loop control. However, if one wants to retain closed-loop control, the control parameters must be adapted to these large time intervals between actual-value signals. This results in a very slow loop controller. Therefore, in accordance with an embodiment of the present invention, the actual value, or rather the system deviation between the discrete instants, is calculated by applying a model to the actual value acquired. This model requires only a very limited accuracy, since it is only the change in the actual value, or rather in the system deviation since the last acquisition of the actual value, that has to be calculated.

DETAILED DESCRIPTION OF THE DRAWINGS

Figure 1:
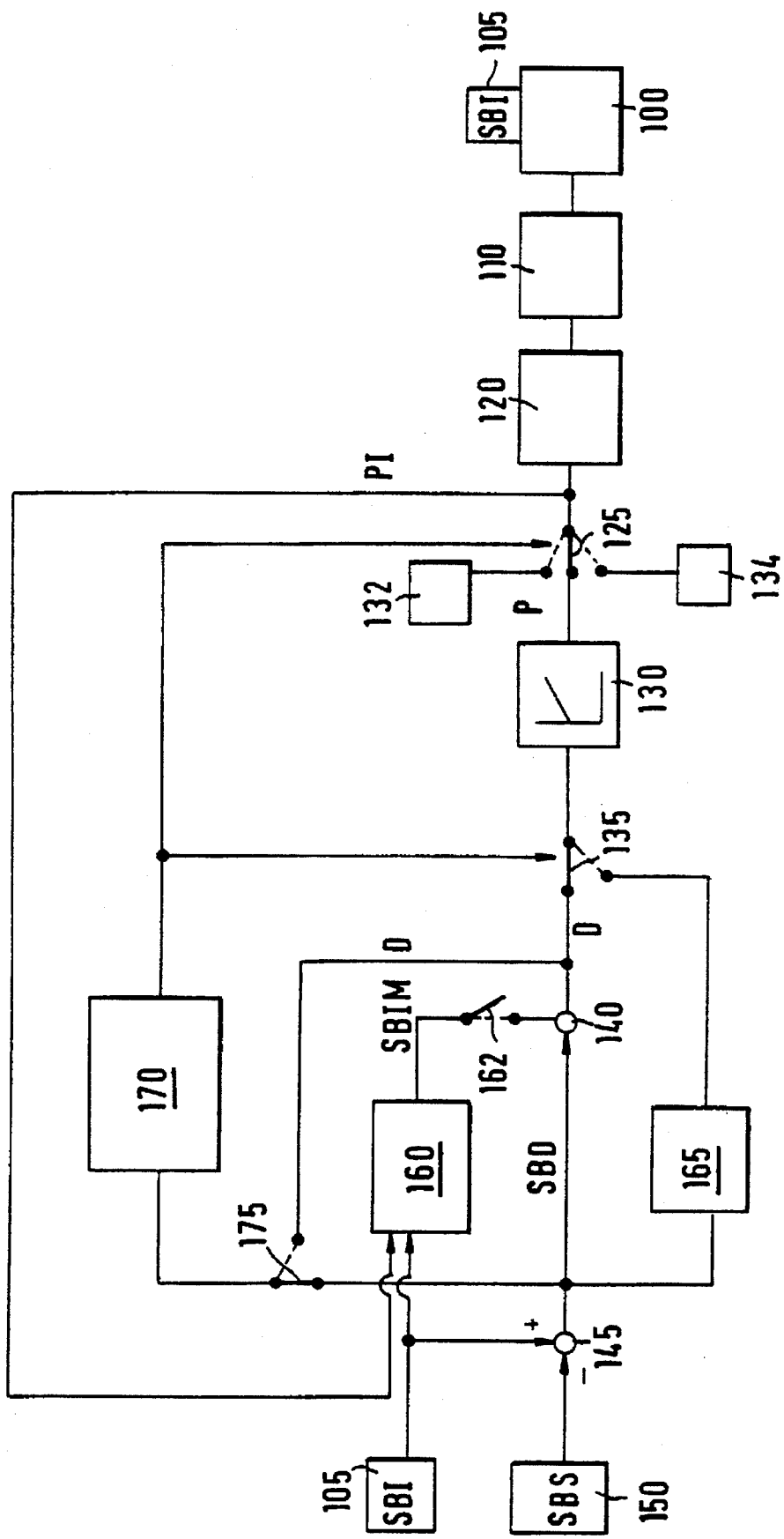
FIG. 1 shows a block diagram of the device according to the present invention.

FIG. 1 depicts a block diagram of an illustrative device according to the present invention. Internal combustion engine 100 receives metered-in fuel from a pump 110. A drive circuit 120 triggers an injection-timing device in the pump 110 to adjust the start of pump delivery (the start of fuel injection).

An output signal P from a loop controller 130 arrives via a first switch 125 at the drive circuit 120 for the injection-timing device. An output signal D from a node 140 is fed via a second switch 135 to the loop controller 130. The output signal SBD from a summary point 145 is applied to the one input of the node 140. The output signal SBI from a needle-motion sensor 105, which is preferably mounted on the internal combustion engine, is applied to summary point 145 with a positive operational sign. The output signal SBS from a setpoint selection 150 arrives with a negative operational sign at the summing point 145.

By means of the first switch 125, the drive circuit 120 for the injection-timing device is able to alternatively receive an output signal PMAX from a maximum-value selection unit 132 or an output signal PMIN from a minimum-value selection unit 134. By means of the second switch 135, the loop controller is able to receive an output signal from an initialization module 165.

Via a third switch 162, an output signal SBIM from a model 160 is applied to the second input of the node 140. The model 160 receives the output signal SBI from the needle-motion sensor 105 and the current manipulated variable PI. In the simplest exemplified embodiment, the model is a PT1-element or an integrator. However, the model can also be conceived as an observer, or rather as a more or less comprehensive computer program.

The output signal from the node 145 arrives, in addition, at the initialization module 165, as well as via a fourth switch 175 at a switching module 170. By means of the switch 175, the switching module can optionally receive the output signal from the node 140. The switching module 170 applies appropriate trigger signals to the switches 135 and 125.

The switches are usually situated in the position that is drawn in with a solid line. In such a case, the functioning of the device is as follows. Starting from the comparison between the setpoint value SBS, which is able to be specified by the setpoint selection 150, and the actual value SBI for the start of injection, the loop controller 130 defines a signal P to be applied to the drive circuit 120 for the injection-timing device. The loop controller 130 preferably exhibits PI action. However, the invention is not limited to loop controllers having PI action. It can also be applied to systems in which loop controllers having a different action are used.

The signal P controls the adjustment angle of the fuel injection. This adjustment angle is preferably realized by the drive circuit for the injection-timing device by triggering a solenoid valve with a pulse duty factor. The pressure in the injection-timing device is able to be influenced by means of this solenoid valve. The injection-timing device assumes a specific position in dependence upon the pressure. Depending on the position of the injection-timing device, the injection begins at different instants. The exact instant of the beginning of injection is able to be acquired, for example, by means of a needle-motion sensor 105.

This acquired actual value SBI is compared with respect to the start of injection to the setpoint value SBS and fed to the loop controller.

If large system deviations occur, for example, when there is a substantial change in the setpoint value SBS, then the injection-timing device requires a certain time to reach the new setpoint value. Therefore, the present invention provides for the system deviation SBD to be fed to the switching module 170. If the switching module recognizes that the system deviation SBD is greater than an upper threshold value, or smaller than a lower threshold value, then the second switch 135 is switched into its position shown with a dotted line.

Moreover, depending on whether the system deviation falls below a lower threshold value or rises above an upper threshold value, the switch 125 is switched to its upper (to 132) or its lower (to 134) position. Thus, the drive circuit 120 for the injection-timing device receives either a maximum value PMAX or a minimum value PMIN. The result is that the injection-timing device and, consequently, the actual value, assume their new value very quickly. If the system deviation SBD lies outside of a range defined by the upper and lower threshold values, then the loop controller is switched off and a maximum value is specified for the manipulated value. If the system deviation lies within the defined range, then the loop controller 130 is active.

In accordance with a further embodiment of the present invention, several ranges can be defined. In this case, it is possible for different values to be selected in the various ranges.

When the loop controller is switched off, i.e., when the switch 135 and 125 are opened, the I-component of the loop controller is frozen. This means that the output quantity P from the loop controller is stored. When the loop controller is switched on again, i.e., when the switch 125 goes over again into its position drawn with a solid line, the switch 135 returns to its original position after a slight delay.

Figure 2:
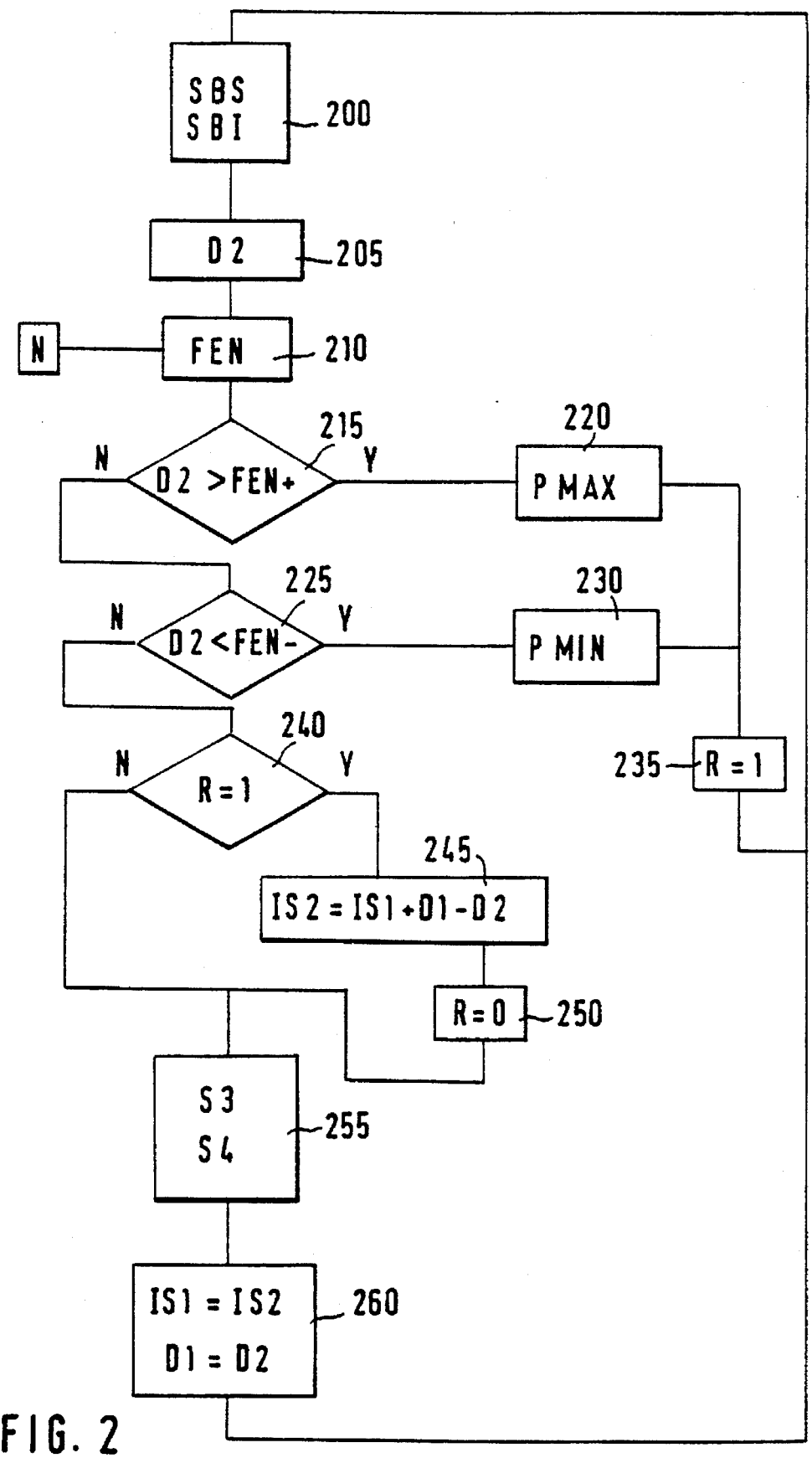
FIG. 2 is a flow chart for the method according to the present invention.

Referring to FIG. 2, in a first step 200, the setpoint value SBS and the actual value SBI are acquired (or determined) for the start of injection. The system deviation D2 is determined in a second step 205. The defined range within which a closed-loop control and outside of which an open-loop control take place is then specified in step 210.

The magnitude of this range is usually constant. In accordance with a still further embodiment of the present invention, the magnitude of this range, the upper and lower threshold values FEN− and FEN+, are specified as a function of the rotational speed. In the simplest case, the threshold values are selected to be inversely proportional to the rotational speed N. Thus, they can be selected in accordance with the formula:

$$FEN=K/N.$$

In this case, K is a constant which corresponds to the magnitude of the range given a defined rotational speed. N is the current, average rotational speed.

A query 215 checks whether the system deviation D2 is greater than the upper threshold value FEN+. If this is the case then the maximum possible manipulated variable PMAX is selected in step 220. This means that the second switch 135 is switched to its lower position, and the first switch 125 is switched to its upper position.

If the query 215 determines that the system deviation is less than the upper limit FEN+, then the second query 225 checks whether the system deviation D2 is less than the lower limit FEN−. If this is the case, then the minimum value PMIN for the manipulated variable P is selected in step 230. This means that switch 135 and switch 125 are brought to their lower positions. In this case, the minimum setpoint selection 134 applies the minimum manipulated variable PMIN to the drive circuit 120 for the injection-timing device.

Steps 220 and 230, in which switch 135 is opened, are followed by step 235, in which a storage device R is occupied by the value 1. This value 1 indicates that the loop controller is becoming inactive and that the drive circuit 120 for the injection-timing device is receiving its minimum or maximum value.

If the query 225 reveals that the system deviation D2 lies within the specified range, then it is checked in step 240 whether the loop controller was switched off during the preceding program run. This means that it is checked whether the storage device R holds the value 1. If R does not equal 1, this means that the loop controller was active during the preceding program run. The program then continues with step 255. If the query 225 determines that the loop controller was not active during the preceding program run, then the initialization module 165 calculates the manipulated variable IS2 in step 245. This is preferably done in accordance with the following formula:

$$IS2=IS1+D1-D2$$

In the above formula, IS1 is the I-component of the manipulated variable when the loop controller is switched off; D1 is the system deviation when it is switched off; and D2 is the current system deviation when the loop controller is switched on again.

The constant R is subsequently set to zero in step 250. This indicates that the loop controller is now active again. In step 255, switch 125 and switch 135 are subsequently switched into their position that is drawn in with a solid line. In the subsequent step 260, the values for the manipulated variable IS1 and for the system deviation D1 are occupied with the current values. The next program run starts subsequently with step 200.

The manipulated variable is preallocated in the same manner when the initialization module 165 consists of a differentiator. For this purpose, the differentiator continually applies its output quantity to the loop controller while the switch 135 is in its lower position.

In any case, the device specifies the largest (or smallest) possible manipulated variable PMAX (PMIN), and switches off the loop controller when the system deviation SPD lies outside of a range defined by two threshold values FEN+ or FEN. If the system deviation again lies within the range, the loop controller 130 is switched back on.

A smooth changeover is effected when the initialization module 165 is switched on at the time the loop controller is coupled back into the circuit. The optimal adjusting speed is able to be achieved for the injection-timing device within the large-signal range by utilizing only two additional parameters FEN+ and FEN.

The above-mentioned embodiments work optimally when the check-back indication of the actual quantity SBI occurs relatively frequently. If this is not the case at lower rotational speeds, a changeover to an open-loop control may be used in some instances. However, as already described, it is possible to specify the range within which the loop controller is active in dependence upon rotational speed.

One can eliminate adapting the control parameters when the loop controller supplies a new manipulated variable P only when a new actual value is present. This means that the injection-timing device is adjusted more slowly given a falling rotational speed, but it is still adjusted with closed-loop control. The range selected at low rotational speeds is preferably larger than that at high rotational speeds, since the time duration between the occurrence of the actual values is greater at low rotational speeds.

In accordance with a still further embodiment of the present invention, a model 160 is employed. This model simulates the movement of the injection-timing device 120 since the last acquisition of the actual value SBI. Thus, this model continually operates a simulated actual value SBIM, which replaces the acquired start-of-injection actual value SBI. In this case, the device works as follows.

If a signal (SBI) from the needle-motion sensor 105 appears, then the switch 162 is situated in its position that is drawn in with a solid line. In this case, the system deviation SBD is applied to the output of the node 145. If there is no current signal from the needle-motion sensor 105, then the switch 162 is in its closed (drawn with a dotted line) position. In this case, the setpoint value SBS in the node 140 is compared to the output signal from the model 160 SBIM.

Thus, the system deviation follows on the basis of the comparison between the setpoint value SBS and the output signal from the model 160, which specifies the simulated actual value SBIM. This system deviation D is then fed to the loop controller 130 and to the switching module 170 in place of the system deviation SBD.

The system deviation D arrives via the fourth switch 175, in place of the system deviation SBD, at the switching module 170. For this purpose, the third switch 162 and the fourth switch 175 are switched in synchronism with the occurrence of the start-of-injection actual value SBI.

In accordance with a still further embodiment of the present invention, the model simulates the system deviation, and not the actual value, and makes available a correction signal to correct the system deviation SBD. In this case, suitable means keep the output signal from the needle-motion sensor 105 constant, at the last value.

Thus, the signal SBD from the node 145 is constant between the individual measuring pulses and is then corrected accordingly in the summing point 140 by means of the output signal from the model 160. For this purpose, the model 160 makes available a corresponding correction signal during those time intervals in which no current actual value SBI is present.

The actual value of the needle-motion sensor is, therefore, only available at discrete instants and is only acquired at these instants. The system deviation between the discrete instants, in which the actual value is present, is calculated by means of the model 160.

Figure 3:
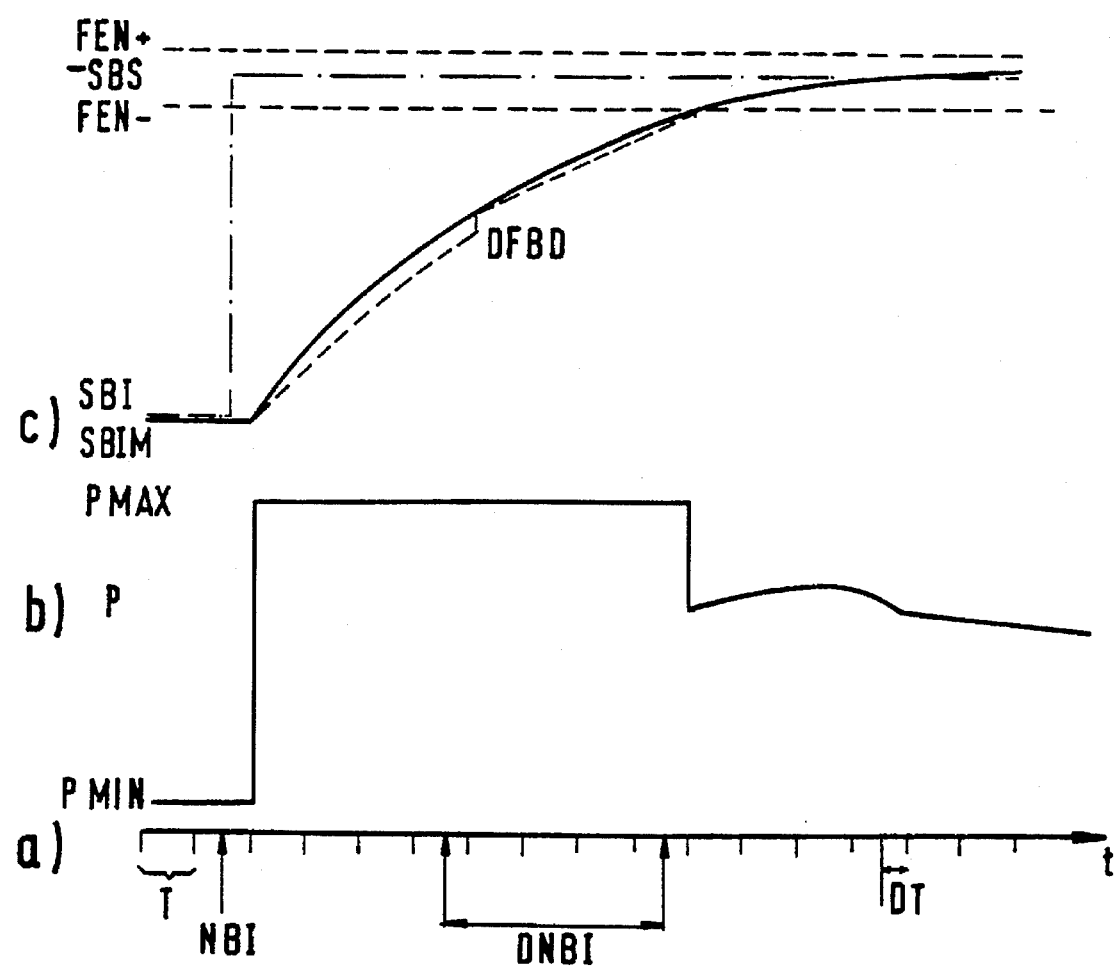
FIG. 3 illustrates various signals plotted over time.

Various signals are plotted over the time t in FIG. 3. In the partial FIG. 3a, the instants, in which the signals NBI from the needle-motion sensor 105 occur, are marked with arrows. They occur at an interval of DNBI. This interval is dependent upon rotational speed. Since only one needle-motion sensor is generally provided, this signal occurs once per revolution of the engine. The time interval between two such signals amounts, for example, in FIG. 2, to approximately 37 msec.

The individual program runs are executed with a fixed sampling time T. Thus, for example, the program run in accordance with FIG. 2 is executed approximately every 10 msec. These instants when the program runs start are marked by perpendicular lines. Generally, the pulses from the needle-motion sensor 105 do not occur simultaneously with the sampling instants T. The difference between the two pulses is denoted by DT.

The manipulated variable P is plotted over time in the partial FIG. 3b. The setpoint value SBS is drawn in with a dot-dash line in the partial FIG. 3c. A solid line marks the actual value SBI. The start of injection SBIM calculated by the model 160 is drawn in with a dotted line. Also plotted are the threshold values FEN+ and FEN−, which correspond to the range within which a closed-loop control takes place.

At the beginning of the time interval being considered, the setpoint value SBS and the actual value SBI nearly conform with one another. After an abrupt change in the setpoint value SBS, as drawn in FIG. 3c, there is no change whatsoever in the manipulated variable or in the actual value within the time DT until the next sampling pulse. The system deviation is only recalculated at the next sampling interval. At this instant, the device recognizes that the system deviation is greater than the threshold value FEN+. The result is that the manipulated variable assumes its maximum value PMAX.

The change in the manipulated variable P causes the actual value SBI to rise over time. The start of injection SBIM calculated by the model 160 likewise rises over time. This signal is drawn in with a dotted line. If the next signal from the needle-motion sensor appears, then the model 160 is adjusted in the next sampling interval. This means that the output signal SBIM from model 160 is corrected so as to allow the values of the output signal SBIM from model 160 and the measured actual value SBI to conform. The correction value is denoted by DFBD in the Figure. The value of the output signal SBIM starts, in turn, at the acquired value SBI of the actual value.

This process is continued until the system deviation D is smaller than the range defined by the threshold values FEN+ and FEN. At this instant, the loop controller 130 is activated, and the output signal from the loop controller is set to a corresponding value. The loop controller 130 defines the corresponding manipulated variable P in dependence upon the system deviation between the actual value SBIM determined by the model 160 and the setpoint value SBS.

In this specific embodiment, the same threshold values FEN+ and FEN can be retained for all operating ranges, in particular in all rotational-speed ranges. By this means, the degree of complexity required for the application is reduced.

What is claimed is:

1. A method for controlling an injection of fuel into an internal combustion engine by a final controlling element, comprising the steps of:

obtaining an actual value corresponding to an actual injection time of the internal combustion engine;

obtaining a setpoint value from a setpoint selection device;

calculating a system deviation based upon the actual value and the setpoint value;

providing a value for a manipulated variable to the final controlling element based upon an output of a loop controller when the system deviation lies within a first range of values, the first range of values bounded by a first predetermined threshold and a second predetermined threshold;

providing a maximum value for the manipulated variable to the final controlling element when the system deviation lies outside the first range of values; and controlling the final controlling element to inject fuel into the internal combustion engine as a function of the manipulated variable.

2. The method according to claim 1, wherein the loop controller is active only within the first range of values.

3. The method according to claim 1, wherein the loop controller has at least Proportional-Plus-Integral action.

4. The method according to claim 1, further comprising the step of freezing an I-component of the loop controller when the loop controller is inactive.

5. The method according to claim 1, further comprising the steps of:
- storing a current I-component of the loop controller and a current system deviation when the loop controller changes from an active state to an inactive state; and
- setting the I-component to a next value based upon the stored I-component value, the stored system deviation, and a subsequent system deviation when the loop controller changes from the inactive state to the active state.

6. The method according to claim 1, further comprising the steps of:
- storing a current I-component of the loop controller when the loop controller changes from an active state to an inactive state; and
- setting the I-component to a next value based upon the stored I-component value and a derivative of the system deviation when the loop, controller changes from the inactive state to the active state.

7. The method according to claim 1, wherein the actual value is acquired only at discrete instants, the system deviation between the discrete instants being specified by a model.

8. The method according to claim 7, wherein the model is a PT1 element.

9. The method according to claim 1, wherein the final controlling element is an injection-timing device of a fuel-metering device for a self-igniting internal combustion engine.

10. A controller for controlling an injection of fuel into an internal combustion engine by a final controlling element, comprising:
- a set point selection device for providing a setpoint value;
- a sensor for obtaining an actual value corresponding to an actual injection time of the internal combustion engine;
- a summing node coupled to outputs of the sensor and set point selection device for providing a system deviation based upon the actual value and the setpoint value;
- a loop controller; and
- a switch for coupling an output of the loop controller to the final controlling element when the system deviation lies within a first range of values, and for coupling a maximum value for the manipulated variable to the final controlling element when the system deviation lies outside the first range of values, the first range of values bounded by a first predetermined threshold and a second predetermined threshold, an output of the switch providing a value for a manipulated variable to the final controlling element, the final controlling element injecting fuel into the internal combustion engine as a function of the manipulated variable.

11. The controller according to claim 10, wherein the loop controller is active only within the first range of values.

12. The controller according to claim 1, wherein the loop controller has at least Proportional-Plus-Integral action.

13. The controller according to claim 10, wherein an I-component of the loop controller is frozen when the loop controller is inactive.

14. The controller according to claim 10 further comprising a storage device; and
- wherein a current I-component of the loop controller and a current system deviation are stored in the storage device when the loop controller changes from an active state to an inactive state; and
- wherein the I-component of the loop controller is set to a next value based upon the stored I-component value, the stored system deviation, and a current system deviation when the loop controller changes from the inactive state to the active state.

15. The controller according to claim 10 further comprising a storage device; and
- wherein a current I-component of the loop controller is stored in the storage device when the loop controller changes from an active state to an inactive state; and
- wherein the I-component is set to a next value based upon the stored I-component value and a derivative of the system deviation when the loop controller changes from the inactive state to the active state.

16. The controller according to claim 10, further comprising a model coupled to the sensor, and wherein the actual value is acquired only at discrete instants, the system deviation between the discrete instants being specified by the model.

17. The controller according to claim 16, wherein the model is a PT1 element.

18. The controller according to claim 10, wherein the controller is for controlling an injection-timing device of a fuel metering device for a self-igniting internal combustion engine.

19. A controller for controlling an injection of fuel into an internal combustion engine by a final controlling element, comprising:
- means for monitoring an actual value corresponding to an actual injection time of the internal combustion engine;
- means for calculating a system deviation based upon the actual value and a setpoint value;
- means for providing a value for a manipulated variable to the final controlling element based upon an output of a loop controller when the system deviation lies within a first range of values, the first range of values bounded by a first predetermined threshold and a second predetermined threshold;
- means for providing a maximum value for the manipulated variable to the final controlling element when the system deviation lies outside the first range of values; and
- means for controlling the final controlling element to inject fuel into the internal combustion engine as a function of the manipulated variable.

20. The controller according to claim 19, wherein the loop controller is active only within the first range of values.

21. The method according to claim 1, wherein the first predetermined threshold and the second predetermined threshold are each a function of a rotational speed of the internal combustion engine.

22. The controller according to claim 10, wherein the first predetermined threshold and the second predetermined threshold are each a function of a rotational speed of the internal combustion engine.

23. The controller according to claim 19, wherein the first predetermined threshold and the second predetermined threshold are each a function of a rotational speed of the internal combustion engine.

* * * * *